United States Patent [19]
Yamada et al.

[11] Patent Number: 5,104,426
[45] Date of Patent: Apr. 14, 1992

[54] METHOD OF AND APPARATUS FOR SEPARATING GAS MIXTURE

[75] Inventors: Ryōkichi Yamada, Katsuta; Tetsuro Haga, Hitachi; Shuntaro Koyama, Katsuta; Akio Yamamoto, Kudamatsu; Naoya Iwama, Yokohama; Yasuo Funayama; Yuji Itakura, both of Chiba, all of Japan

[73] Assignees: Hitachi, Ltd.; The Tokyo Electric Power Company, Incorporated, both of Tokyo, Japan

[21] Appl. No.: 608,350

[22] Filed: Nov. 2, 1990

[30] Foreign Application Priority Data

Nov. 8, 1989 [JP] Japan .................. 1-290526

[51] Int. Cl.$^5$ ............................................ B01D 53/04
[52] U.S. Cl. ...................................... 55/18; 55/26; 55/58; 55/62; 55/68; 55/75; 55/161; 55/179; 55/389
[58] Field of Search ............... 55/18, 20, 21, 25, 26, 55/33, 58, 59, 62, 68, 75, 161–163, 179, 180, 389

[56] References Cited

U.S. PATENT DOCUMENTS

| | | | |
|---|---|---|---|
| 3,149,934 | 9/1964 | Martin | 55/58 |
| 4,011,065 | 3/1977 | Münzner et al. | 55/58 X |
| 4,321,069 | 3/1982 | Ritter | 55/179 X |
| 4,516,985 | 5/1985 | Winter | 55/25 X |
| 4,519,813 | 5/1985 | Hagiwara et al. | 55/26 |
| 4,627,856 | 12/1986 | von Gemmingen | 55/33 X |
| 4,640,694 | 2/1987 | Leitgeb et al. | 55/26 |
| 4,684,377 | 8/1987 | Haruna et al. | 55/62 X |
| 4,693,730 | 9/1987 | Miller et al. | 55/26 X |
| 4,722,742 | 2/1988 | Leitgeb | 55/26 |
| 4,756,723 | 7/1988 | Sircar | 55/25 |
| 4,781,735 | 11/1988 | Tagawa et al. | 55/26 |
| 4,840,647 | 6/1989 | Hay | 55/26 |
| 4,917,710 | 4/1990 | Haruna et al. | 55/26 |

FOREIGN PATENT DOCUMENTS

| | | | |
|---|---|---|---|
| 3338494 | 5/1985 | Fed. Rep. of Germany | 55/25 |
| 50-155475 | 12/1975 | Japan . | |
| 53-140281 | 12/1978 | Japan . | |
| 56-45724 | 4/1981 | Japan . | |
| 59-199503 | 4/1981 | Japan . | |
| 60-155501 | 8/1985 | Japan | 55/25 |

Primary Examiner—Robert Spitzer
Attorney, Agent, or Firm—Antonelli, Terry, Stout & Kraus

[57] ABSTRACT

A gas mixture separating apparatus comprises an adsorption column packed with an adsorbent; a gas mixture column-end feeding device for feeding a gas mixture to one of two ends of the adsorption column; an unadsorbed-gas column-end discharge device for discharging unadsorbed gas from the other end of the adsorption column; a pressurizing device for pressurizing the gas mixture to be fed to the end of the adsorption column; and an adsorber depressurizing device connected to the end of the adsorption column on the gas mixture feed side. It comprises further a gas mixture side-injection device for feeding the gas mixture to the adsorbent in the adsorption column from the shell side thereof. Further, the gas mixture side-injection device is branched from the gas mixture column-end feeding device. Further, the apparatus comprises concentration sensors for detecting the concentration of the same sorts of components in gas flow as are adsorbed by the adsorbent in the adsorption column in the vicinity of the locations at which a plurality of gas mixture side injection devices are installed.

22 Claims, 11 Drawing Sheets

PROCESS 1a

PROCESS 1b

PROCESS 1c

PROCESS 1d

METHOD OF AND APPARATUS FOR SEPARATING GAS MIXTURE

BACKGROUND OF THE INVENTION

1. Field of the Invention

This invention relates to a method of separating gas mixture by pressure swing adsorption and an apparatus executing the method and more particularly to technologies suitable for separating oxygen from air and for enriching oxygen efficiently.

2. Description of the Prior Art

In case oxygen is enriched by adsorption and removal of nitrogen from a gas mixture such as air, pressure swing adsorption methods for separating oxygen and nitrogen from air have been used by repeating adsorption and desorption in turn with assistance of pressure changes. Such methods comprise an adsorption process for producing oxygen as product by allowing nitrogen to be selectively adsorbed after feeding air pressurized by a compressor to an adsorber packed with a solid adsorbent such as synthetic zeolite, for example, 5A.3X; a regeneration process for desorbing nitrogen in the adsorbent by depressurizing the adsorber after completion of the adsorption process; and a pressurization process for pressurizing the adsorber with product oxygen or air up to the pressure for adsorption process after completion of the regeneration process. In carrying out pressure swing adsorption methods, because of the necessity of producing product oxygen continuously, it has been a general practice to provide a plurality of adsorbers packed with the above-mentioned adsorbent and change gas flow passages by means of the valves before and after the adsorbers so as to effect the above-mentioned adsorption, regeneration and pressurization processes.

In order to produce product oxygen continuously, it is necessary to provide at least two adsorbers packed with the above-mentioned adsorbent. In operation of a pressure swing adsorption process with a two-column system, for example, the regeneration and pressurization processes are effected in column 100B, while the adsorption process is made in column 100A. Each process of column 100B takes the same time as the corresponding process in column 100A does. Subsequently in column 100A the regeneration and pressuring processes are effected, while an adsorption process is effected in column 100B. It is a basic type of procedure to produce product oxygen continuously by switching over columns 100A and 100B in turn. In addition to a pressure swing adsorption process with two-column system, those with three- and four- column systems are also applied for producing product oxygen continuously. It is important to improve the recovery rate of product oxygen which is expressed as the ratio of product oxygen quantity produced to oxygen quantity in feedstock air.

In the pressure swing adsorption process with two-column system to obtain a predetermined level of oxygen concentration a column in which the adsorption process is occurring is fed continuously with feedstock air so as to continue producing oxygen until immediately before nitrogen adsorption zone reaches the product outlet end of adsorption bed. In this case, in the vicinity of the product-outlet end there exists the adsorbent which can still adsorb more nitrogen, i.e., there exists oxygen which can still be produced as product by further adsorption of nitrogen from feedstock air. The remaining oxygen is discharged outside the system without being taken out as product at the stage of shifting from the adsorption process to the succeeding regeneration process by means of vacuum pump etc., thus reducing the above-mentioned recovery rate of product oxygen.

As a measure to prevent lowering in recovery rate of product oxygen in a two-column system, there is disclosed in Japanese Laid-Open Patent Application No. SHO. 53-140281, a method for improving the loading efficiency of the adsorber and hence, the recovery rate of product oxygen by controlling longitudinal width of the nitrogen adsorption zone, paying attention to the relation between the longitudinal width of the nitrogen adsorption zone and adsorption pressure conditions in the adsorber in the course of the adsorption process. According to the above-mentioned Japanese Patent Application, a single column system is employed to achieve improvement in recovery rate of product oxygen by depressurizing the adsorber, to discharge product oxygen at reduced pressure, in accordance with adsorption pressure conditions so as to allow longitudinal width of the nitrogen adsorption zone to be reduced for the purpose of reducing remaining oxygen quantity in the nitrogen adsorption zone at the outlet end of packed bed which is discharging product oxygen, before the nitrogen adsorption zone reaches the outlet end.

Further, in Japanese Laid-Open Patent Applications No. SHO. 59-199503 and No. SHO. 56-45724, are described methods for improving the recovery rate of product oxygen by introducing a pressure equalization step wherein high-enriched oxygen from column 100A is transferred upon completion of the adsorption process in column 100A and completion of the regeneration process in column 100B until pressures of columns 100A and 100B become equal.

Furthermore, it is reportedly mentioned that improvement in the recovery rate of product oxygen can be achieved by carrying out the method described in Japanese Laid-Open Patent Application No. SHO. 50-155475. This method using column 200A and 200B, as shown in FIG. 6, comprises steps 1a, 1b, 1c and 1d which will be mentioned below.

At step 1a, while column 200A is under adsorption process, column 200B, which has already completed the adsorption process, is in the course of regeneration process. Secondly, at the stage of shifting from step 1a to step 1b, supply of feedstock air into column 200A is ceased, and regeneration process in column 200B is completed. At step 1b, oxygen which is highly enriched in column 200A is supplied into column 200B via nozzle part. The supply is continued until the pressure in column 200A becomes equal to or slightly higher than that in column 200B. At the time of shifting to step 1c after completion of step 1b, the nozzle at the top of the column 200A is connected to the nozzle at the bottom of column 200B, and the enriched oxygen remaining in the vicinity of the top of column 200A is transferred into column 200B via the nozzle at the bottom thereof. The high-enriched oxygen supplied from the nozzle at the top of column 200A at step 1B is eventually discharged from the nozzle at the top of column 200B by the gas transfer. Further, after shifting from step 1c to step 1d, nitrogen with high concentration is fed through the nozzle at the bottom of column 200A. With this high-concentrated nitrogen, oxygen remaining in column 200A is purged out and transferred into column 200B. After completion of the above-mentioned series of steps, column 200A is subjected to regeneration process and column 200B which is fed with feedstock air is subjected to adsorption process. This method aims at improving the recovery rate of product oxygen by purging out the oxygen remaining in column 200A with high-concentrated nitrogen to recover the oxygen.

Out of the above-mentioned conventional technologies, according to the technology described in Japanese Laid-Open Patent Application No. SHO. 53-140281, supply of feedstock air is ceased before break-through of the nitrogen adsorption zone at product outlet end of adsorption bed, and the longitudinal width of the nitrogen adsorption zone is controlled to become narrower by reducing the pressure in the adsorption column to the level not more than half of the adsorption column. There is, however, limitation in narrowing the longitudinal width of the nitrogen adsorption zone so as to recover the oxygen in the vicinity of the product outlet end of the adsorption bed, in case the concentration of product oxygen from the outlet is maintained at a predetermined value. Furthermore, according to this technology, there remains the adsorbent which does not reach break-through due to depressurization of the adsorption column and discharging of the gas in the column before the break-through. Such an adsorbent does not contribute to separation of feedstock air so that it can not be used effectively. Therefore, this technology poses a problem in that oxygen recoverable as product remains more or less in the vicinity of the outlet end of the adsorption bed, and no attention is paid to the reduction in the effect on improving the recovery rate of product oxygen, and also to the reduction in the quantity of the oxygen which can be produced per unit volume of the adsorbent due to the presence of the adsorbent which does not contribute to the separation of feedstock air.

On the other hand, in the conventional technology which introduces the pressure equalization step as described in Japanese Laid-Open Patent Applications No. SHO. 59-196503 step at a pressure $P_1$, while column 300B is subjected to regeneration step at $P_2$, as shown in FIG. 7A. At the time of completion of these steps, supply of feedstock air to column 300A is ceased and oxygen which is enriched in column 300A is fed from the nozzle at the top of column 300A into column 300B via nozzle at the top of column 300B, as shown in FIG. 7b. The supply of oxygen into column 300B is made until the pressure of columns 300A and 300B become $(P_1+P_2)/2$, i.e., equal to each other. After completion of the pressure equalization step, column 300A is shifted to the regeneration step, while column 300B is subjected to pressurization step using product oxygen. In the pressurization step, it is required to cease the adsorption step when column 300A is in the adsorption step under a condition that a considerable amount of high-enriched oxygen remains in the adsorbent. (There is a case that more than half of the adsorbent bed is filled with the high-enriched-oxygen.) This is because as soon as high-enriched-oxygen is transferred into column 300B and the latter is subjected to the adsorption step, the high-enriched oxygen needs to be discharged. Once the nitrogen adsorption zone reaches breakthrough at the outlet end of the adsorption bed in column 300A, less-concentrated oxygen is introduced into column 300A, during the pressure equalization step and discharged from column 300B during the adsorption step. Thus, the adsorption step of column 300A needs to be completed under a condition that the high-enriched-oxygen is held in the vicinity of the outlet end of the adsorption bed. Therefore, the pressure swing adsorption process including the pressure equalization step poses a problem in that no consideration is taken on lowering of effect on improving the recovery rate of product oxygen due to oxygen recoverable as product oxygen remaining more or less in the outlet end of the adsorption bed. Since much high-enriched oxygen remains in the adsorption column during the adsorption step, the nitrogen adsorption zone can proceed only up to the medium height of the column 300A. In such a state, a great deal of adsorbent which can adsorb more nitrogen remains in the adsorbent bed, so that adsorbent can not be utilized efficiently. Therefore, there is another problem in that no consideration is taken on the reduction in the quantity of oxygen which can be produced per unit volume of adsorbent.

Further, in the prior art described in Japanese Laid-Open Patent Application No. SHO. 50-155475, it is envisaged that greater improvement in the recovery rate of product oxygen can be achieved as compared with the above-mentioned other prior arts, because the oxygen remaining at the outlet end of the adsorption bed is purged out with nitrogen having a high concentration and recovered as product as mentioned above.

In the above-mentioned conventional technologies, however, a common problem, which no has not been taken into consideration, resides in that each of the above-mentioned steps is effected, after ceasing supply of feedstock air. Supply of air and suspension thereof require starting and stopping of the compressor etc., resulting in discrete operations which may cause operational problems. To solve this point at issue, the pressure swing adsorption process with two-column/two-series system, which involves in practice operation of four columns, is applied to achieve continuous operation. In the two-column process, since feedstock air supply is stopped without fail, there is a problem in that no consideration is taken to improvement in operationability in continuous operation.

Still further, there is a common defect in that no consideration is taken to the fact that a great quantity of high-enriched oxygen remains in the adsorber in the course of adsorption step. Besides, there is a common problem in that no attention is paid to the reduction in the quantity of oxygen which can be produced as product per unit volume of the adsorbent, since when nitrogen adsorption zone reaches half way in the adsorption column, supply of feedstock air is ceased so that the adsorbent which does not contribute to the separation of feedstock air remains more or less in the adsorbent bed. Furthermore, there is another common problem in that suspension of feedstock air supply causes a reduction in the quantity of feedstock air to be treated per unit volume of the adsorbent, if the same operational time is allocated for each of the above-mentioned processing, and that reduction in the quantity of oxygen which can be produced as product take places. This indicates that the quantity of the adsorbent required for obtaining the same quantity of oxygen for the same cycle and for the same oxygen concentration will increase. Accordingly, since the adsorbent is expensive, increase in plant costs such as the cost of adsorbent at the time of plant construction and also the cost of adsorbent for replenishment during ordinary operation is inevitable.

SUMMARY OF THE INVENTION

The present invention has for its object to increase the quantity of product oxygen per unit volume of an adsorbent in the pressure swing adsorption process with two-column system, thereby achieving considerable reduction in the construction cost of oxygen production facilities.

Further, the present invention aims at lowering the construction cost of coal gasification complex power generation plant.

The above-mentioned objects can be achieved by providing a gas mixture separating apparatus comprising: an adsorption column packed with an adsorbent; a gas mixture column-end feeding device for feeding a gas mixture to one of two ends of the adsorption column; an unadsorbed-gas column-end discharging device for discharging unadsorbed gas from the other end of the adsorption column; a pressurizing device for pressurizing the gas mixture to be fed to the end of the adsorption column: and an adsorber depressurizing device connected to the end of the adsorption column on the gas mixture feed side; characterized in that it further comprises a gas mixture side-injection device for feeding said gas mixture to the adsorbent in the adsorption column from the shell side thereof.

The above-mentioned objects can be achieved by providing a gas mixture separating apparatus comprising: an adsorption column packed with an adsorbent; a gas mixture column-end feeding device for feeding a gas mixture to one of two ends of the adsorption column: an unadsorbed-gas column-end discharging device for discharging unadsorbed gas from the other end of the adsorption column; an unadsorbed-gas column-end feeding device for adsorbent regeneration, which is connected to the side of the adsorption column where the unadsorbed gas is discharged; a gas mixture pressurizing device for pressurizing the gas mixture; and an adsorber depressurizing device connected to the end of the adsorption column on the gas mixture feed side, characterized in that it further comprises a gas mixture side-injection device for feeding said gas mixture to the adsorbent in the adsorption column from shell side thereof, and an unadsorbed-gas side-injection device for feeding the unadsorbed gas to the adsorbent in the adsorption column from the shell side thereof.

The above-mentioned objects can be achieved by providing a gas mixture separating apparatus comprising: an adsorption column packed with an adsorbent; a gas mixture feeding device for feeding a gas mixture to one of two ends of the adsorption column; an unadsorbed-gas discharging device for discharging an unadsorbed gas from the other end of the adsorption column; a first unadsorbed-gas column-end feeding device connected to the adsorption-column end on the unadsorbed gas discharge side; a gas mixture pressurizing device for pressurizing the gas mixture: an adsorber depressurizing device connected to the end of the adsorption column on the gas mixture feeding side and; a second unadsorbed gas column-end feeding device for feeding the unadsorbed gas from the end of the adsorption column on the gas mixture feed side, characterized in that it further comprises at least one of either gas mixture side-injection device for feeding the gas mixture to the adsorbent in the adsorption column from the shell side thereof or unadsorbed-gas side-injection device for feeding said unadsorbed gas to the adsorbent in the adsorption column from the shell side thereof.

The above-mentioned objects can be achieved by providing a gas mixture separating apparatus comprising: an adsorption column packed with an adsorbent; a gas mixture column-end feeding device for feeding a gas mixture to one of two ends of the adsorption column: an unadsorbed gas column-end discharging device for discharging unadsorbed gas from the other end of the adsorption column; a gas mixture pressurizing device for pressurizing said gas mixture to be fed to the end of the adsorption column; and an adsorber depressurizing device connected to the end of the adsorption column, characterized in that it further comprises: a plurality of said gas mixture side-injection devices for feeding said gas mixture to the adsorbent in the adsorption column; a switching over device for switching over a plurality of said gas mixture side-injection devices one another; concentration sensors for detecting the concentration of the same sorts of components in gas flow as are adsorbed by the adsorbent in the adsorption column in the vicinity of the locations at which a plurality of gas mixture side-injection devices are installed: and a control device for switching over the switching-over device depending upon the value of the concentration detected by the concentration sensors.

The above-mentioned objects can be achieved by carrying out a method of separating gas mixture comprising: an adsorption process in which a gas mixture is fed from one of two ends of an adsorption column packed with an adsorbent so as to allow adsorbable components in the gas mixture to be adsorbed and unadsorbed gas is discharged from the other end of the adsorption column: an adsorbent regeneration process wherein after completion of the adsorption process adsorbed components are desorbed by depressurizing the adsorption column by sucking gas therein in the opposite direction to the direction of gas mixture feeding; a pressurizing process wherein after the adsorbent regeneration process, the adsorption column is pressurized up to adsorption pressure either by refeeding the gas mixture into the adsorption column from the same direction as the gas mixture is fed or by feeding unadsorbed gas into the adsorption column; the adsorption process being repeated again after completion of the said pressuring process, characterized in that the gas mixture is fed into the adsorption column from the shell side thereof at the latter stage of the adsorption process.

The above-mentioned objects can be achieved by carrying out a method of separating gas mixture comprising: an adsorption process in which a gas mixture is fed from one of two ends of an adsorption column packed with an adsorbent so as to allow adsorbable components in the gas mixture to be adsorbed, and unadsorbed gas is discharged from the other end of the adsorption column; an adsorbent regeneration process wherein after completion of the adsorption process the adsorption column is depressurized by sucking gas in the adsorption column in the opposite direction to the feeding direction of the gas mixture and further the adsorbed components are purged by feeding the unadsorbed gas from the opposite direction; and a pressurizing process wherein after completion of the adsorbent regeneration process the adsorption column is pressurized to the adsorption pressure either by refeeding the gas mixture to the adsorption column from the same direction as the gas mixture is fed or by feeding the unadsorbed gas into the adsorption column, the adsorption process being repeated after completion of the pressurizing process, characterized in that the gas mixture is fed into the adsorption column from the shell side thereof at the latter stage of the adsorption process and the unadsorbed gas is fed into the adsorption column from the shell side thereof at the latter stage of unadsorbed gas feeding in the adsorbent regeneration process.

BRIEF DESCRIPTION OF THE DRAWINGS

FIG. 1b is a sectional view of a gas injection nozzle as shown in FIG. 1a;

FIG. 1c is a diagram of a control system for switching over the gas injection nozzle of the column in the course of the adsorption process as shown in FIG. 1a;

FIG. 1d is a diagram of a control system for switching over the column in the course of the product oxygen injection step as shown in FIG. 1a;

FIG. 2 is a timing chart showing the operational schedule of the apparatus as shown in FIG. 1a;

DESCRIPTION OF THE PREFERRED EMBODIMENTS

Figure 1A:
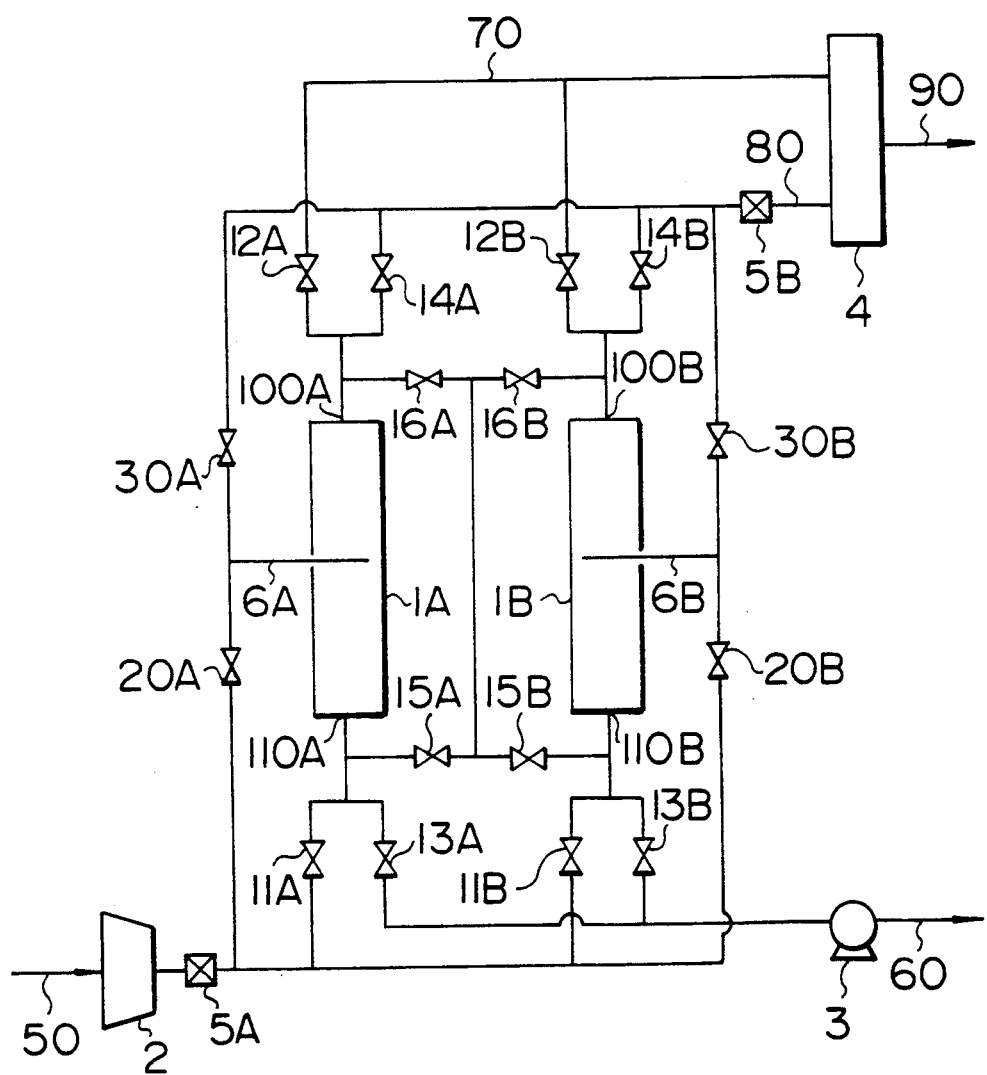
FIG. 1a is a diagram showing the configuration of an embodiment according to the present invention.

The present invention will now be described below by way of example only with reference to FIG. 1a. First of all, the arrangement of this embodiment will be described. There are two systems for column 1A and 1B respectively; which include switching-over valves 11A, 20A and 11B, 20B, respectively, for feeding feedstock gas mixture, switching-over valves 12A, 30A and 12B, 30B, respectively, for discharging desorbed gas, product gas outlet lines, switching-over valves 15A, 16A and 15B, 16B respectively for connecting columns 1A and 1B with each other in series, pressure regulator valves 5A and 5B, a compressor 2 for supplying feedstock gas mixture under pressure, a vacuum pump 3 for adsorbent regeneration; a tank 4 for storing product gas line 80 which transfers product from the tank 4 to the regulator valve 5B, and line 90 which withdraws product gas from the tank.

In the next place the operation of the above-mentioned system is described. Air as mixed gas feedstock is pressurized by compressor 2 through piping 50 up to a predetermined adsorption pressure $P_1$, and is fed through pressure regulator valve 5A into column 1 selected by valve 11 as an adsorption column. Oxygen separated and enriched in column 1, which has been selected by valve 12 as an adsorber, is temporarily stored in product tank 4, and a great part of the oxygen stored in product tank 4 is withdrawn to outside of the system concerned through the line 90, and a part of it is transferred and injected into column 1 selected by valve 14 through pressure regulator valve 5B so as to pressurize column 1 and to keep the pressure in column 1 constant. Desorbed gas during adsorbent regeneration is sucked by vacuum pump 2 from column 1 selected by valve 13 and vented into atmosphere through piping 60.

In the columns 1A and 1B, a chronological cycle of adsorption, regeneration and pressurization steps are repeated in turn, and repeating operation and operational time for each step can be set at will with cycle sequencer devices. Further description in detail is made by taking as an example a case that columns 1A and 1B are switched over each other at every 60 seconds in each of the above-mentioned steps, i.e., operation cycle is "60 seconds $\times$ 2 = 120 seconds".

In the first half of one cycle, column 1A is in adsorption operation, whereas column 1B is in desorption operation, and vice versa in the second half.

Figure 2:
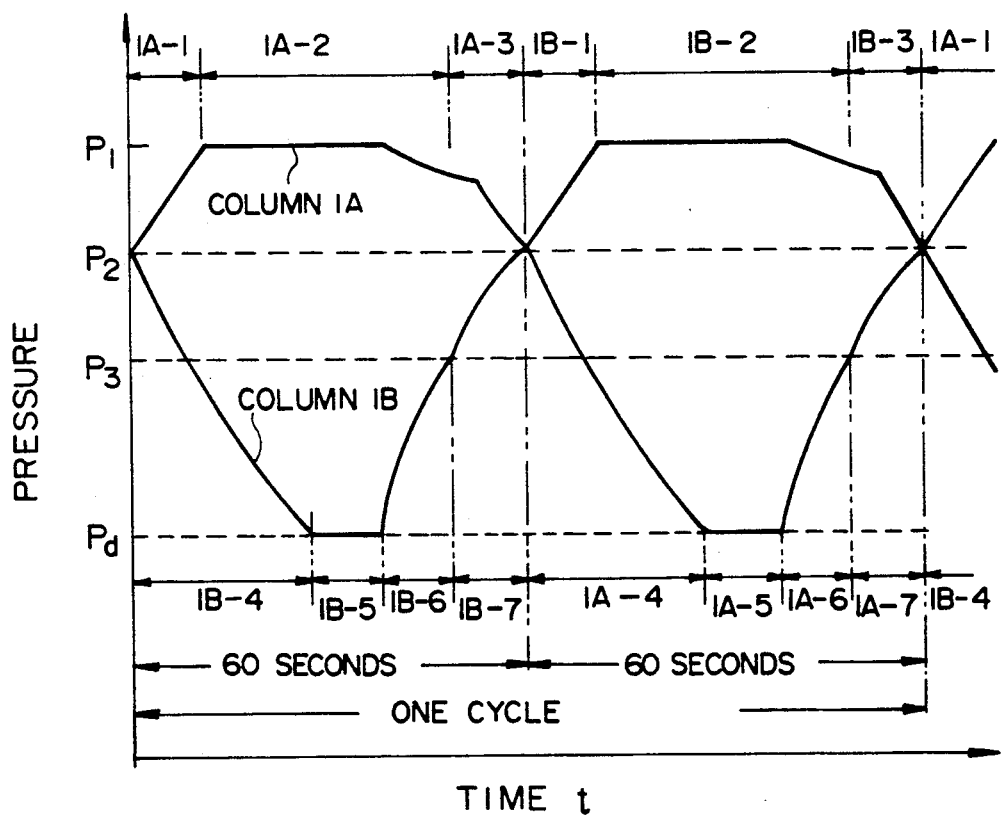
Figure 3A:
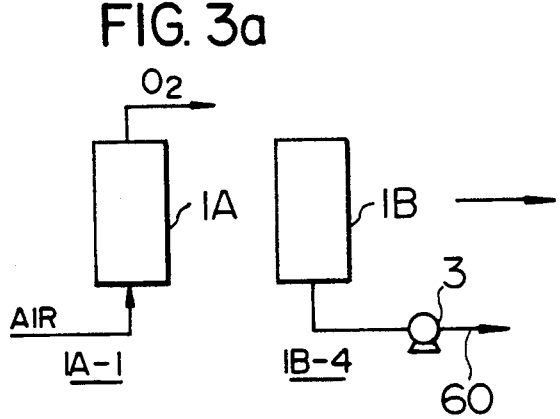
FIG. 3 is a block diagram showing gas flow patterns according to the operational schedules of the apparatus as shown in FIG. 2.
Figure 3B:
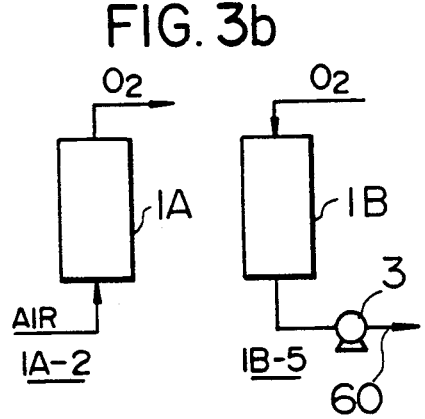
Figure 3C:
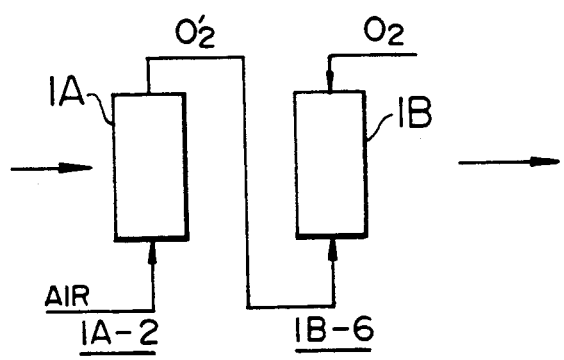
Figure 3D:
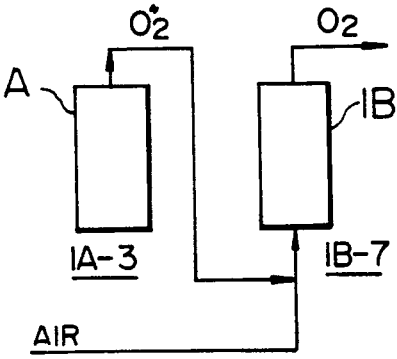
Figure 3E:
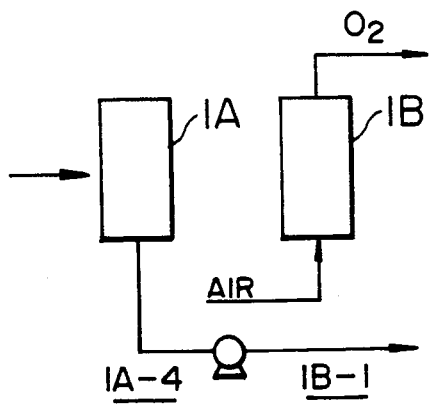

FIG. 2 illustrates chronological change in pressure in columns 1A and 1B in relation to operation time at each step of columns 1A and 1B.

Gas flow in the above-mentioned operation is shown in FIG. 3. In adsorption operation of column 1A air pressurized by compressor 2 up to $P_1$ of 1.2 ata is fed from nozzle 110A into column 1A through pressure regulator valve 5A and valve 11A, and initial adsorption step 1A-1 is executed during pressurization of column 1A from $P_2$ of 0.9 ata to $P_1$ of 1.2 ata. And then main adsorption step 1A-2 at pressure $P_1$ of 1.2 ata will follow. During step 1A-2 enriched oxygen is fed from nozzle 100A through valve 12A and piping 70 into tank 4 and stored therein. On the other hand, column 1B is depressurized by vacuum pump 3 from $P_1$ of 0.9 ata to $P_d$ of 0.48 ata, and as a result, nitrogen contained in an adsorbent is desorbed. Regeneration step 1B-4, at which desorbed gas is vented off via nozzle 110B, valve 13B and piping 60, is effected. Product oxygen in product tank 4 is injected through nozzle 100B into column 1B after pressure regulator valve 5B and valve 14B are opened. Product oxygen is injected so as to keep regeneration pressure $P_d$ constant at about 0.48 ata. The injection of product oxygen is aiming at accelerating desorption of nitrogen captured in the adsorbent and regeneration of the adsorbent by making use of difference in partial pressure between nitrogen and oxygen. Namely, regeneration step 1B-5, at which more acceleration of the nitrogen desorption is achieved, is carried out by depressurizing by means of vacuum pump 3 and by injection of product oxygen. Near halfway progression of regeneration step 1B-5 valves 14B are closed and valve 30B is opened, and product oxygen is injected through gas injection nozzle 6B. Upon completion of regeneration step 1B-5 at column 1B, column 1A is still in the course of adsorption step 1A-2, during which valve 12A is closed and valves 15B and 16A are opened. When oxygen concentration indicator (not illustrated in FIG. 1) indicates approximately 50% of product oxygen concentration (hereinafter referred as "medium-enriched oxygen"), in consequence, medium-enriched-oxygen is introduced from nozzle 100A into column 1B. At that time, air is introduced from gas injection nozzle 6A into column 1A through valve 20A, after valve 20A is opened and valve 11A is closed. Simultaneously therewith, pressurization step 1B-6 in column 1B is brought into operation in which the pressure of column 1B is increased from $P_d$ of 0.48 ata to level of $P_3$ of 0.7 ata by introducing a part of product oxygen in product tank 4 into column 1B after valve 13B is closed and pressure regulator valve 5B and valves 14B and 30B are opened. During this operation column 1A is in the course of adsorption step 1A-2, during which valve 20A is kept open until the concentration of oxygen reaches the level of 23% (hereinafter referred as "low-enriched oxygen") at the outlet end of the adsorption bed. At the same time, in column 1B system valve 11B is opened. By such operation, air flow via valve 11B and low-enriched oxygen from valve 100A via valves 16A and 15B will flow together and are injected from nozzle 110B into column 1B. In consequence of the injection, pressurization/adsorption step 1B-7 is effected, which includes pressurization step wherein the pressure in column 1B is increased from the level of pressure $P_3$ of 0.7 ata to that of pressure $P_2$ of 0.9 ata, and adsorption process by air introduction is proceeded. In column 1A, on the other hand, depressurization/discharge step 1A-3 is effected in order to reduce the pressure in column 1A from $P_1$ of 1.2 ata to $P_2$ of 0.9 ata during discharging of low-enriched oxygen. At the end of adsorption step 1A-3 in column 1A and regeneration, pressurization and pressurization/adsorption steps in column 1B are completed. During the next sixty seconds, regeneration, pressurization and pressurization/adsorption steps in column 1A and adsorption step in column 1B will be effected.

In column 1B system initial adsorption step 1B-1 is carried out, air which is pressurized by compressor 2 up to $P_1$ of 1.2 ata is fed from nozzle 110B through valve 11B into column 1B while the pressure in column 1B is being pressurized from $P_2$ of 0.9 ata to $P_1$ of 1.2 ata. Subsequently at pressure $P_1$ of 1.2 ata, adsorption step 1B-2 is made during which enriched oxygen is supplied into product tank 4 from piping 70 via valves 100B and 14B and stored therein. On the other, nitrogen in the adsorbent is desorbed in column 1A, by depressurizing column 1A from pressure $P_2$ of 0.9 ata to pressure $P_d$ of 0.48 ata by means of vacuum pump 3, and regeneration step 1A-4 in column 1A is effected while desorbed gas is discharged into the atmosphere from piping 60 via nozzle 110A and valve 13A. And, after pressure regulator valve 5B and valve 14A are opened, product oxygen in product tank 4 is injected from nozzle 100A into column 1A. Product oxygen is injected so as to keep regeneration pressure $P_d$ constant at about 0.48 ata. Namely, regeneration step 1A-5 is made, at which more acceleration of desorption of nitrogen captured in adsorbent is made. Near halfway progression of regeneration step 1A-5, valve 14A is closed and valve 30A is opened, and part of product oxygen is injected from gas injection nozzle 6A. Upon completion of regeneration step 1A-5 in column 1A, column 1B is still in the course of adsorption step 1B-2, during which valve 12B is closed and (in case valves 15A and 6B have been closed already) valves 15A and 16B are opened.

When oxygen concentration indicator mounted at nozzle 100B (not shown in FIG. 1) indicates approximately 50%, or so, the above-mentioned medium-enriched oxygen is discharged. As a result, medium-enriched oxygen is introduced into column A via nozzles 100B and 110A. At that time, after valve 20B is opened and valve 11B is closed, air is introduced from gas injection nozzle 6B into column 1B via valve 20B. Simultaneously therewith, pressurization step 1A-6 in column A is effected, in which the pressure in column 1A is increased from $P_d$ of 0.48 ata up to $P_3$ of 0.7 ata by introducing part of product oxygen in product tank 4 into column 1A after valve 3A is closed and pressure regulator valve 5B and valves 14A and 30A are opened. Thereafter, column 1B is in the course of adsorption step 1B-2, during which valve 20B is closed when the above-mentioned low-enriched oxygen is detected at the nozzle 100B. At the same time, valve 11A is opened in column A system. By such operation, air flow via valve 11A and low-enriched oxygen flow from valve 100B at the top of column 1B via valve 16B and 15A join before valve 110A, and are injected from nozzle 110A into column 1A. In consequence of the injection pressurization/adsorption step 1A-7 is made, which includes pressurization step, wherein the pressure of column 1A is increased from the level of $P_3$ of 0.7 ata to that of $P_2$ of 0.9 ata and adsorption step wherein air introduction is made. In column 1B, on the other hand, depressurization/discharge stage 1B-3 is made in order to reduce the pressure in column 1B from $P_1$ of 1.2 ata to $P_2$ of 0.9 ata during discharging of low-enriched oxygen. Then, adsorption step in column 1B and regeneration, pressurization and pressurization/adsorption steps in column 1A are completed, and one cycle operation is completed. From the second cycle operation the same operation as that in the first cycle is repeated.

The number of the above-mentioned injection nozzle is not limited to only one, but it can be plural. In case of one injection nozzle it is preferable to install the injection nozzle in the middle part of column 1, or at a location between the middle and the top of column 1. It is possible to make the pressure differential between the column top and the bottom smaller than that in the case of air supply from the bottom of column 1 by installing the injection nozzle at such locations as above-mentioned. Consequently, better contact of feedstock air with the adsorbent is realized, which results in higher utilization rate of adsorbent, i.e., increase of nitrogen quantity to be adsorbed per unit volume of adsorbent and which leads to improvement in yield of product oxygen. Besides, improvement of nitrogen desorption efficiency can be achieved during the injection step of product oxygen because diffusion rate of oxygen into pores in the adsorbent is accelerated.

Figure 1B:
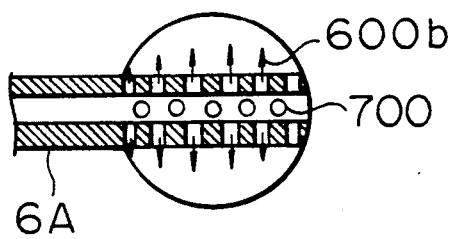
Figure 1B:
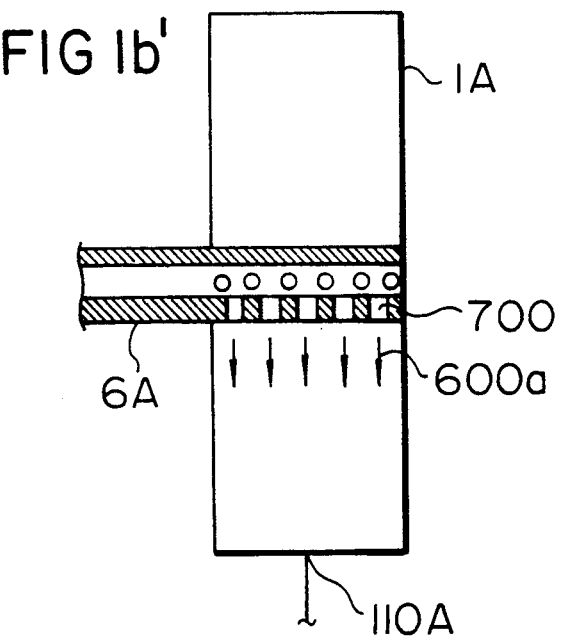

As shown in FIG. 1b, a plurality of gas injection holes 700 are prepared in injection nozzle 6. The injection holes 700 make it possible to obtain uniform gas flow 600a and 600b, respectively, toward the nozzle at the bottom of column 1 and in radial direction. By obtaining such gas flows, the efficiency of contact of gas with the adsorbent can be improved during the adsorption or injection step, which ensures improvement in adsorbent utilization rate and acceleration of nitrogen adsorption or desorption.

In case of installing a plurality of the injection nozzles, on the other hand, it is acceptable to install them optionally at any location between the top and bottom of column 1. It is, however, preferable to install them at location levels of one quarter, one half and three quarters of the total height of column 1 from the level of nozzle 110. In addition, even in case a plurality of injection nozzles 6 are provided, the arrangement of injection holes 700 is the same as that in case of single injection nozzle 6, as shown in FIG. 1b.

Figure 1C:
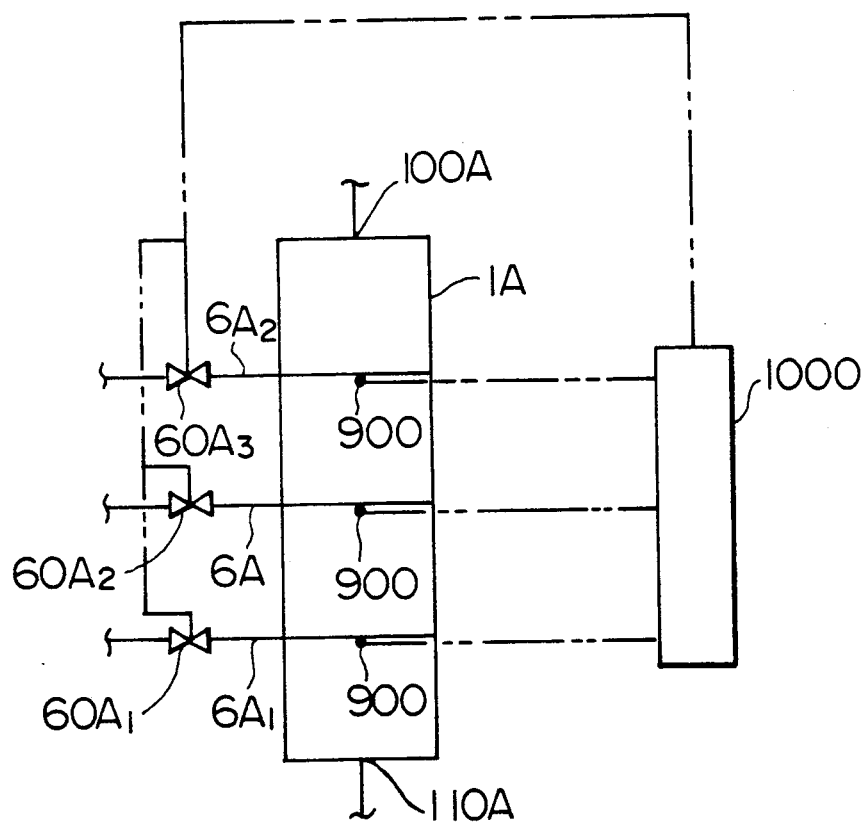

Next, as an example, the operation in case where a plurality of injection nozzles 6 are provided when column 1A is under adsorption step will be described. As shown in FIG. 1c, sensors 900 for detecting the concentration of nitrogen are provided in the vicinity of injection nozzles 6A1, 6A and 6A2. By so doing, progressive performance (concentration profile or gradient) of the nitrogen adsorption zone is monitored. For example, when a predetermined nitrogen concentration is detected in the vicinity of injection nozzle 6A1, valve 60A1 is opened, and then feedstock air is fed into column 1A under the control of controller 1000. When injection nozzle 6A is in use, and valve 60A2 is opened the other two injection nozzles 6A1 and 6A2 are out of use. Finally, injection nozzle 6A2 is in use and only valve 60A3 is opened. Next, description is made below on operation when a plurality of injection nozzle 6 are provided, and column 1B is under product oxygen injection step, as an example.

Figure 1D:
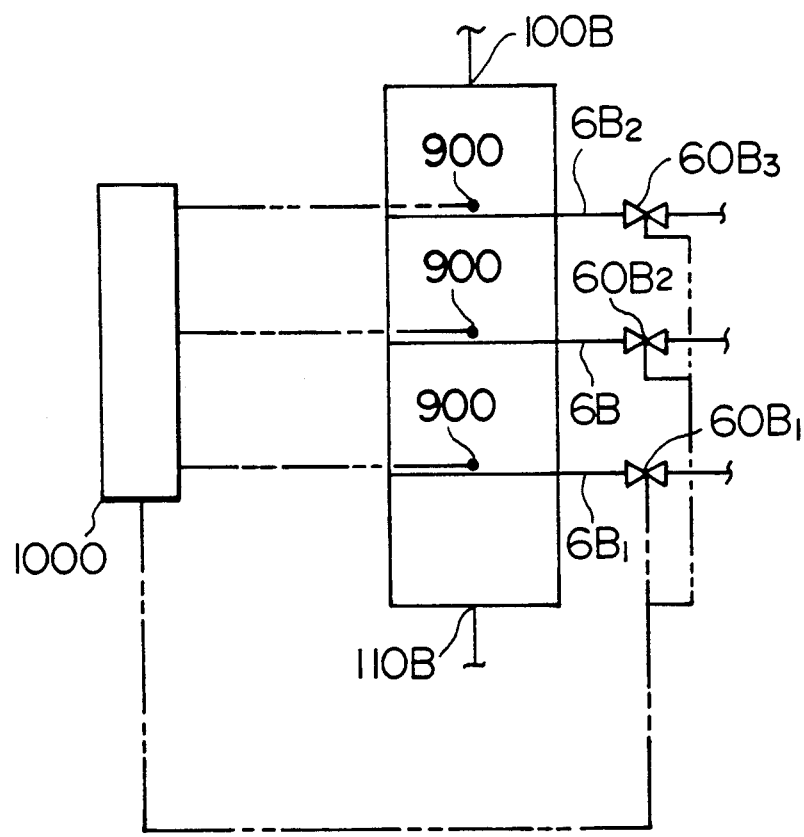

As shown in FIG. 1d, sensors 900 for detecting nitrogen concentration are provided in the vicinity of injection nozzles 6B1, 6B and 6B2, by which progressive performance of the nitrogen adsorption zone is monitored. For example, when a predetermined nitrogen concentration is detected in the vicinity of injection nozzle 6B2, valve 60B3 is opened under the control of controller 1000 and product oxygen is fed into column 1B. When injection nozzle 6B is in use, valve 60B2 is opened and the other two injection nozzles 6B1 and 6B2 are put out of use. Finally, injection nozzle 6B1 is in use and only valve 60B1 is opened.

EXAMPLE 1

An experiment was made using the apparatus shown in FIG. 1 and by setting operational times and pressures at each step shown in FIG. 2 as follows:

Operational times were 10 seconds for each of steps 1A1 and 1B-1, 40 seconds for each of steps 1A-2 and 1B-2, 10 seconds for each of steps 1A-3 and 1B-3, 30 seconds for each of steps 1A-4 and 1B-4, 10 seconds for each of steps 1A-5 and 1B-5, 10 seconds for each of steps 1A-6 and 1B-6, 10 seconds for each of steps 1A-7 and 1B-7, 10 seconds for each of feed stock air supply from gas injection nozzles 6A and 6B, and 5 seconds for each of product oxygen supply to column 1A and 1B. And, operating pressures were $P_1$ of 1.2 ata for adsorption step, $P_2$ of 0.9 ata for initial adsorption steps and $P_1$ of 0.7 ata for final pressurization/adsorption step. Furthermore, operation was run so as to produce product oxygen having a concentration of 90%.

In consequence, the output quantity (Q) of product oxygen was 21 Nm$^3$/hr in case air supply flow rate ($G_a$) was $G_a$ = 200 Nm$^3$/hr, and recovery rate ($\eta$) of product oxygen was 45% ($\eta = ((21 \times 0.9)/(200 \times 0.21)) \times 100$)

EXAMPLE 2

An experiment was made using the apparatus shown in FIG. 1 under the condition that air supply and product oxygen injection through gas injection nozzle 6A or 6B were not made. Conditions on operational times and pressures were the same as those described in Example 1.

As a result, the output quantity (Q) of product oxygen was about 19.6 Nm$^3$/hr at air supply flow rate of 200 Nm$^3$/hr, and recovery rate ($\eta$) of product oxygen was 42%. In comparison of Example 2 with Example 1, the latter was more effective than the former in improving the recovery rate ($\eta$) of product oxygen by 3%.

Figure 4:
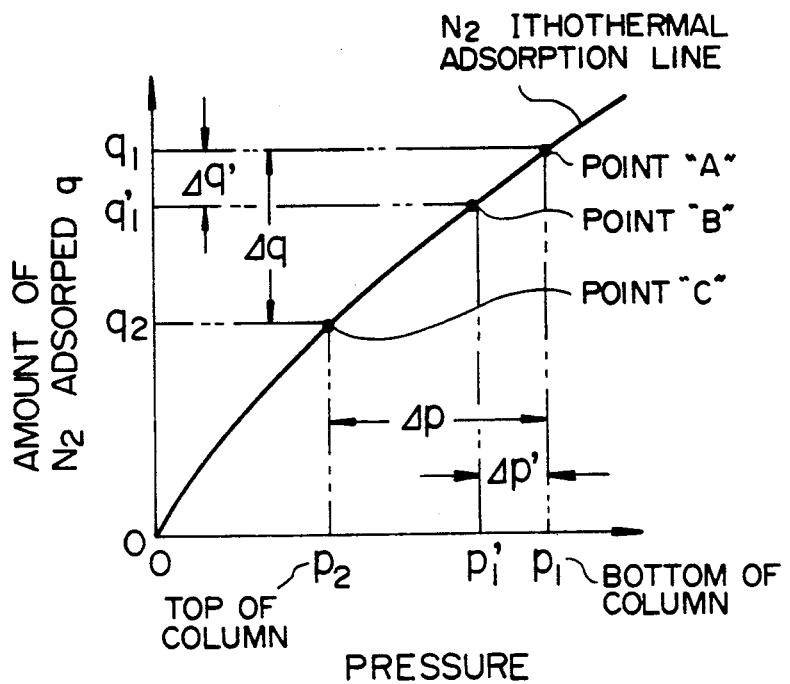
FIG. 4 is a graph showing the relationship between the pressure and the quantity of nitrogen to be adsorbed during the adsorption process in the embodiment.
Figure 5:
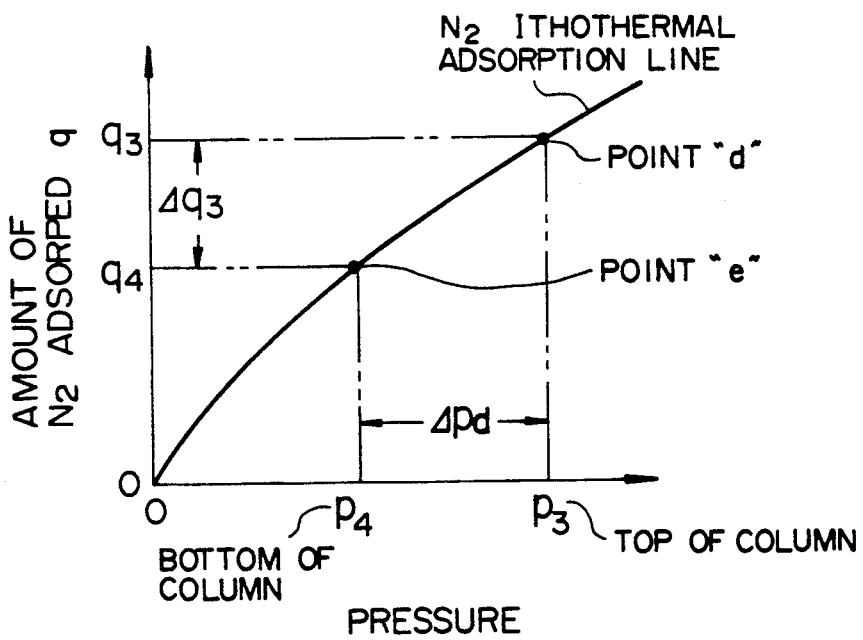
FIG. 5 is a graph showing the relationship between the pressure and the quantity of nitrogen to be adsorbed during the regeneration process in the same embodiment.
Figure 6:
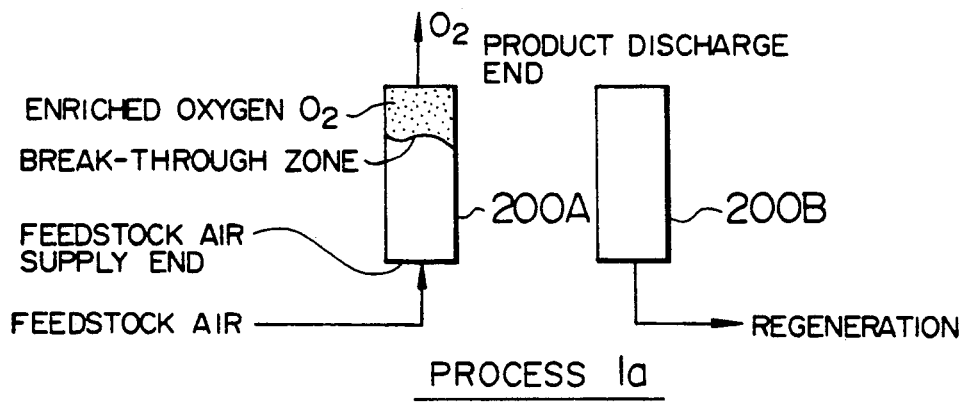
FIG. 6 is a block diagram showing gas flow patterns according to the operational schedules of the prior art.
Figure 6:
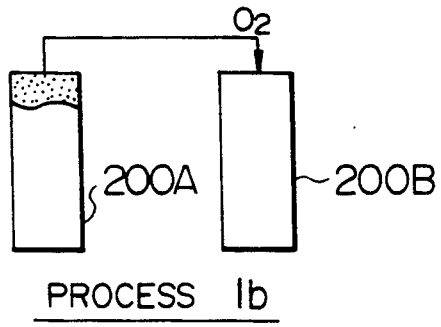
Figure 6:
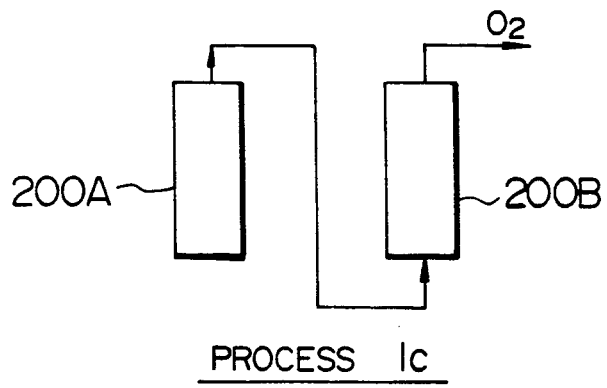
Figure 6:
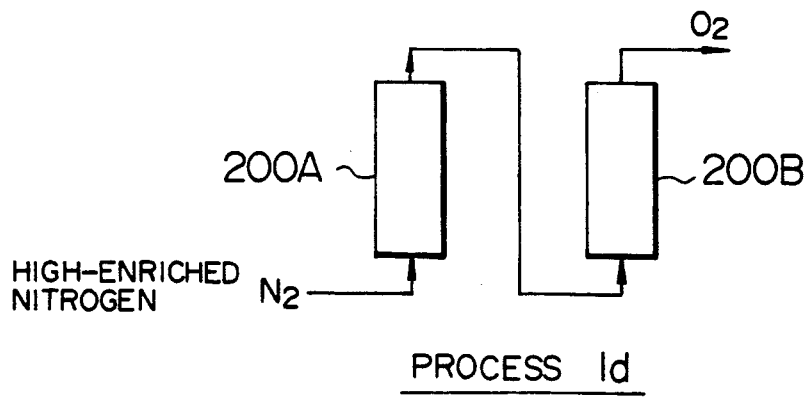
Figure 7A:
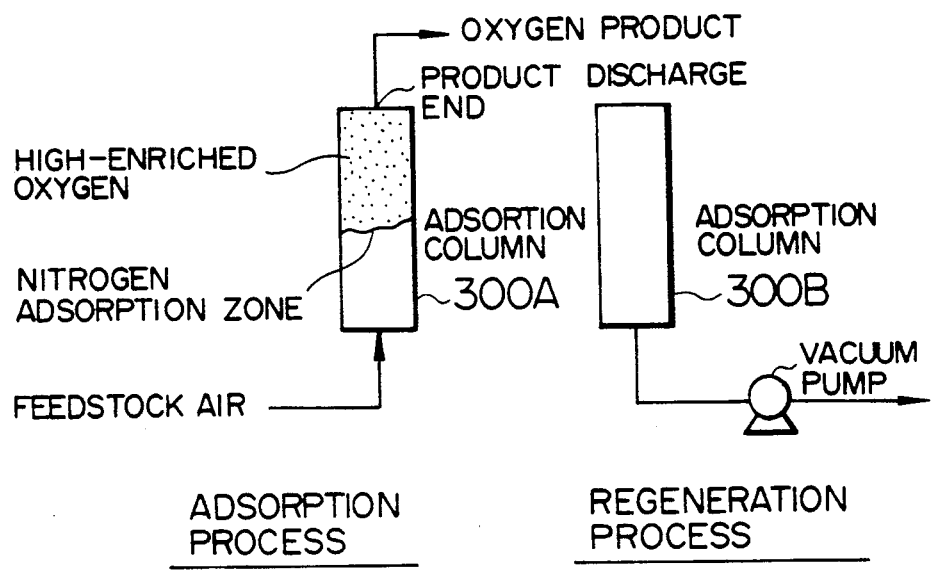
FIGS. 7a and 7b are block diagrams showing the adsorptional condition in the adsorption column at each step of the prior art.
Figure 7B:
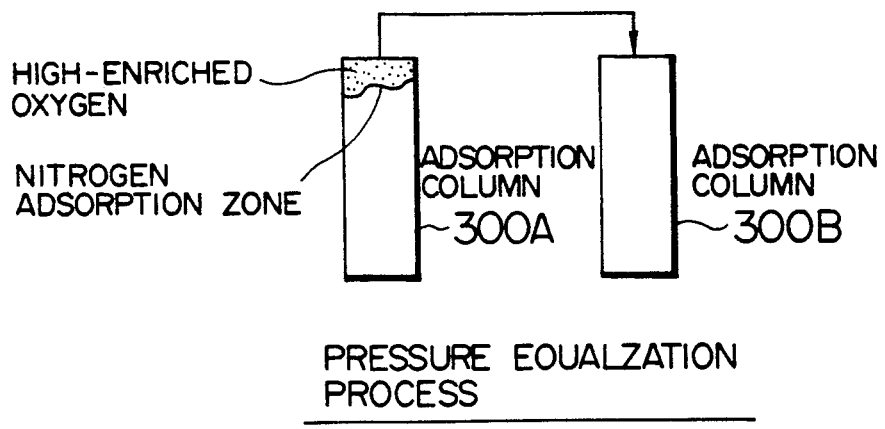

Difference in effectiveness between Example 1, which offers features of the present invention, and Example 2 will become apparent from FIGS. 4 and 5, which show the case where feedstock air and product oxygen are supplied through nozzle 6A or 6B.

Referring to FIG. 4, first of all, the case that air was introduced into one of the columns via gas injection nozzles 6A and 6B at adsorption step will be described. When air is fed from the bottom of a column, a pressure differential ($\Delta P$) between the top and the bottom of the column is created, and the bottom pressure becomes higher than pressure in the top. Referring to the isothermal adsorption curve for nitrogen, shown in FIG. 4, the pressure in the column bottom becomes adsorption pressure $P_1$ of 1.2 ata (air feed pressure) as indicated at point A due to the bottom's being close to air supply nozzle, and quantity of nitrogen adsorbed in the adsorbent in the bottom zone becomes $q_1$. Further, the pressure in the top of the column becomes $P_2$ as indicated at point C owing to pressure drop ($\Delta P$) between the top and the bottom of the column, and the quantity of nitrogen adsorbed in the adsorbent in the top zone becomes $q_2$. Consequently, the adsorption quantity of nitrogen in the top zone ($q_2$) will become less by $\Delta q$ than that in the bottom ($q_1$), which shows the adsorbent in the top zone can still afford to adsorb more nitrogen, which is corresponding to near $\Delta q$, i.e., the adsorbent in the top zone is not made good use of. Whilst, in case adsorption step is made in such a way that air is not fed from the column bottom, but fed from gas injection nozzle 6A or 6B at the well-progressed stage of nitrogen adsorption zone, the pressure in the column top will become closer to the air supply pressure (adsorption pressure $P_1$ of 1.2 ata).

In consequence, the pressure in the column top becomes $P'_1$, which is obtained by deducting the pressure drop ($\Delta P'$) between gas injection nozzle 6A or 6B and the column top from the air supply pressure, and quantity of nitrogen adsorbed becomes $q'_1$. Thus the nitrogen quantity in the adsorbent in the column top takes a favorable turn to $q'_1$, which is larger than $q_2$ in the conventional cases, and the mean adsorption quantity of nitrogen between the column top and the gas injection nozzle 6A or 6B, where the adsorbent can still afford to adsorb more nitrogen, is increased up to approximately $(q'_1 + q_1)/2$, which results in improved utilization rate for an adsorbent, so that the quantity of air to be processed can be increased and the recovery rate of product oxygen can be enhanced.

Further, FIG. 5 shows state of nitrogen adsorbed in terms of adsorbed nitrogen quantity during regeneration step, where the column is depressurized to pressure $P_d$ of 0.48 ata by means of vacuum pump 3. At regeneration step too, a pressure loss is created between the column top and the bottom, and the absolute pressure in the top (near atmospheric pressure) is higher than that in the bottom. The absolute pressure in the top is $P_3$ which is higher than $P_d$ of 0.48 ata, as indicated at point d, and the quantity of nitrogen in the adsorbent becomes $q_3$. The pressure in the bottom is $P_4$ of 0.48 ata, as indicated at point e, and the quantity of nitrogen remaining in the adsorbent becomes $q_4$, which means that desorption is easier at the bottom than at the top. Hence, when desorption of nitrogen remaining in the adsorbent at the top and the bottom is made to a predetermined level, the time required for the desorption by way of product oxygen injection is longer at the top than at the bottom. This leads to reduction in the quantity of air to be fed and processed in the adsorption step, thus causing a drop in the recovery rate of product oxygen. Such difficulties can be overcome by introducing product oxygen simultaneously from, for example, gas injection nozzle 6A or 6B provided at the middle portion of the column and from the top, or by introducing product oxygen from the top of the column to desorb the nitrogen remaining in the adsorbent in the vicinity of the column, and then injecting product oxygen, which contains less nitrogen effective for desorption from gas injection nozzle 6A or 6B to desorb nitrogen remaining in the adsorbent in the top of the column. The above-mentioned methods make it possible to desorb simultaneously nitrogen remaining in the adsorbent in the top and the bottom of the column by a predetermined quantity, so that the promotion of the desorption of nitrogen remaining in the adsorbent in the top of the column can be achieved. By so doing, the quantity of air to be fed and processed at subsequent regeneration step can be increased, thereby increasing the output quantity of product oxygen.

The above-mentioned operation creates difference in effect on improving the recovery rate of product oxygen between Examples 1 and 2.

The following experiments were made using the apparatus shown in FIG. 1 to compare the effect of Example 1 according to the present invention with that of Example 2 according to one of the above-mentioned conventional methods.

EXAMPLE 3

An experiment was made according to the basic type of pressure swing adsorption process having two-column system in such a way as to make adsorption step at column 1A, while both depressurization/regeneration step by vacuum pump and pressurization step with product oxygen are made at column 1B, and vice versa and repeat the same.

The same operational times and pressures as those in Example 2 were used. The following results were obtained.

1) The produced quantity (Q) of product oxygen having a concentration of 90% was:

$$Q = 14.9 \text{ Nm}^3/\text{hr}$$

at 200 Nm³/hr of air feeding rate.

2) The recovery rate ($\eta$) of product oxygen was 32%.

EXAMPLE 4

An experiment was made using two-column type apparatus shown in FIG. 1a in such a way that while column 1A was in course of adsorption step (1.2 ata of operational pressure), column 1B was subjected to depressurization by vacuum pump/regeneration step (0.48 ata of operational pressure) during which pressure equalization step was introduced by feeding oxygen enriched in column 1A into column 1B via nozzle A and valves 16A and 16B after supply of feedstock air to column 1A was stopped. As a result, the recovery rate ($\eta$) of product oxygen was 34%.

EXAMPLE 5

An experiment was made using the apparatus as shown in FIG. 1a in such a way that while column 1A was in the adsorption step (1.2 ata of processing pressure), product oxygen was discharged from nozzle 100A by lowering the pressure in column 1A not more than half of the adsorption pressure after air supply was ceased before the nitrogen adsorption zone broke through. As a result, the recovery rate ($\eta$) of product oxygen was 27.5%.

EXAMPLE 6

An Experiment was made using the two-column type apparatus as shown in FIG. 1a in the following way. While column 1A was in the course of adsorption step (1.2 ata of operational pressure), column 1B was subjected to depressurization by vacuum pump/regeneration step (0.48 ata of processing pressure). And, air supply to column 1A was ceased, and regeneration at column 1B was completed. At that time, oxygen enriched in column 1A was fed into column 1B from nozzle 100A through nozzle 110A and valves 16A and 16B. Subsequently, valve 16B was closed and valve 15B was opened, and the enriched oxygen was fed into column 1B from nozzle 110B, and at the same time, product oxygen was produced from column 1B after valve 12B was opened. As a result, the recovery rate ($\eta$) of product oxygen was 38%.

EXAMPLE 7

Figure 8:
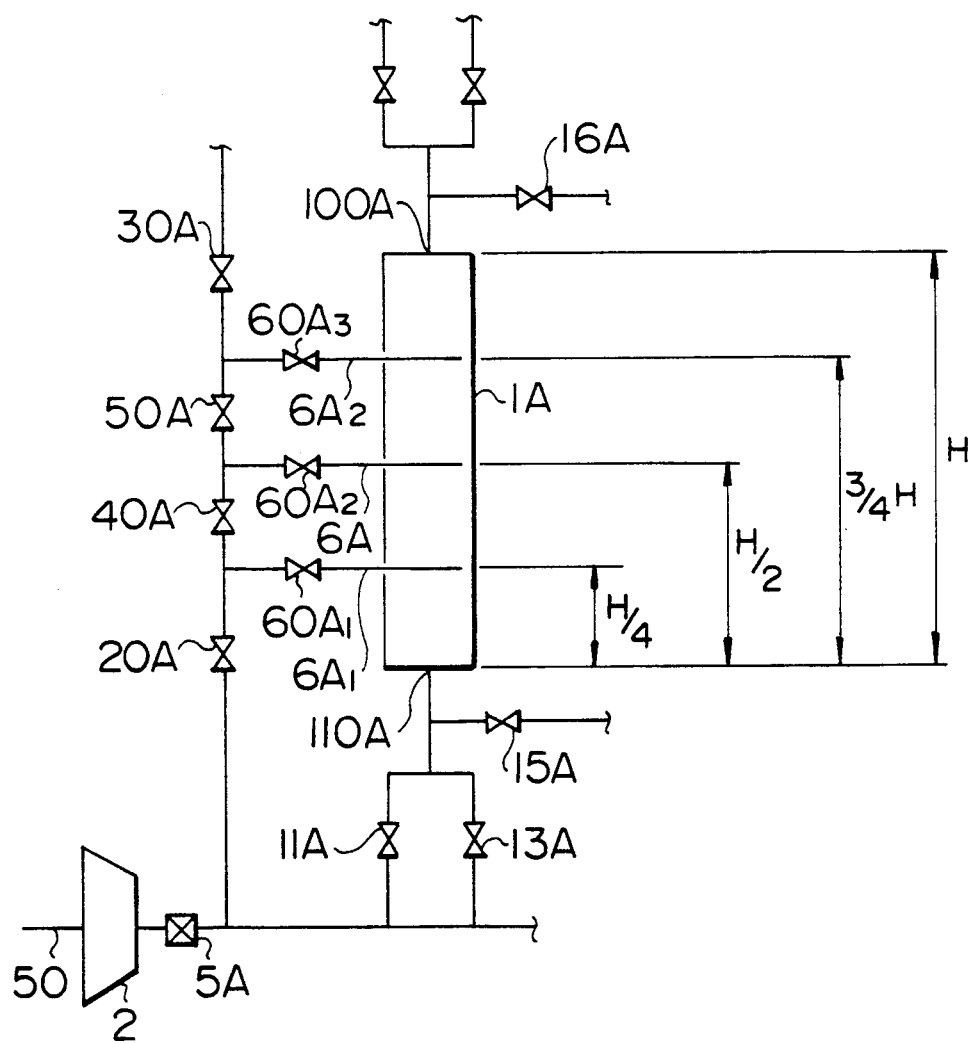
FIG. 8 is a diagram showing the configuration of a system on one side of the columns according to other embodiments of the present invention.
Figure 9:
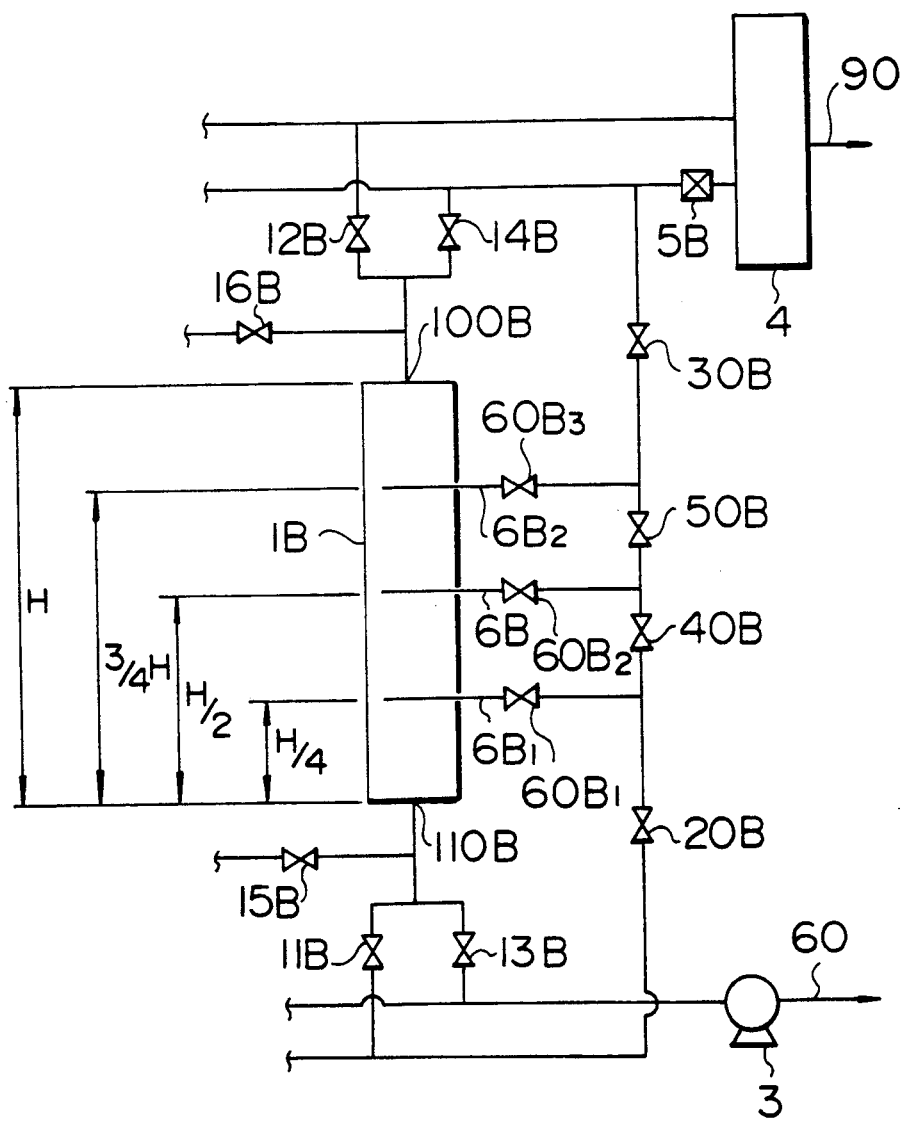
FIG. 9 is a diagram showing the configuration of another system on the other side of the columns according to other embodiments of the present invention.

An experiment was made using apparatus, as shown in FIG. 1a, provided with a plurality of the gas injection nozzles. In this example each of columns 1A and 1B was provided with three nozzles, as shown in FIGS. 8 and 9. Namely, columns 1A and 1B were provided with gas injection nozzles 6A1, 6A and 6A2, and 6B1, 6B and 6B2, respectively, at levels of one quarter, one half and three quarters of total height of Column 1 from nozzle 110. Further, columns 1A and 1B were also provided with switching-over valves 40A, 50A, 60A1, 60A2 and 60A3, and 40B, 50B, 60B1, 60B2 and 60B3, respectively, as shown in FIGS. 8 and 9.

Firstly, feedstock air supply operation in column 1A at adsorption step will be described with reference to FIG. 8.

In this experiment, feedstock air was fed from nozzle 110A by keeping pressure regulator valve 5A and valve 11A open and keeping valves 20A, 40A, 50A, 30A, 60A1, 60A2 and 60A3 shut. Thereafter, feedstock air was fed firstly from gas injection nozzle 6A1 after closing valve 11A and opening valves 20A and 60A1, secondly from gas injection nozzle 6A after closing valve 60A1 and opening valves 40A and 60A2, and finally from gas injection nozzle 6A2 after closing valve 60A2 and opening valves 50A and 60A3. Feedstock air supply time was set such that 40 seconds of adsorption time in Example 1 included 15 seconds from nozzle 110A, 10 seconds each from gas injection nozzles 6A1 and 6A, respectively, and 5 seconds from gas injection nozzle 6A2. Whilst, an example in ease column 1B is in the product oxygen injection step will be described with reference to FIG. 9. First of all, pressure regulator valve 5B and valve 14B were opened and valves 30B, 50B, 40B, 20B, 60B3, 60B2 and 60B1 were closed, and product oxygen stored in product tank 4 was injected from nozzle 100B. After that, product oxygen was fed firstly from gas injection nozzle 6B2 after closing valve 14B and opening valves 20B and 60B3, secondly from gas injection nozzle 6B after closing 60B3 and opening valves 50B and 60B2, and finally from gas injection nozzle 6B1 after closing valve 60B2 and opening valves 40B and 60B1.

Product oxygen injection time was set such that 10 seconds of product oxygen injection time in Example 1 included 3 seconds from nozzle 100B, 3 seconds from gas injection nozzle 6B2, and 2 seconds each from gas injection nozzle 6B and 6B1, respectively.

Other operational conditions were the same as those in Example 1.

The result of this experiment was as follows:

1) the produced quantity (Q) of product oxygen (with a concentration of 90%) was $$Q = 22 \text{ Nm}^3/\text{hr}$$

at 200 Nm³/hr of air feeding rate.

2) The recovery rate ($\eta$) of product oxygen was $$\eta = ((22 \times 0.9/200 \times 0.21)) \times 100 = 47.1\%$$

The above-mentioned result reveals that greater improvement in the recovery rate of product oxygen can be achieved by this example using a plurality of gas injection nozzles as compared with Example 1 using only single gas injection nozzle.

Further, if a system is arranged so as to enrich oxygen from air by means of the gas mixture separating apparatus according to the present invention, supply the enriched oxygen into a coal gasification furnace of a coal gasification complex power generating plant to thereby gasify coal, supply the gas into a gas turbine which drives a generator, recover the heat of exhaust gases from the gas turbine by a boiler to thereby generate steam, and supply the steam thus generated into a steam turbine which drives another generator, then the supply cost of oxygen is reduced so that the unit cost of electric power can be reduced correspondingly.

According to the present invention, since the adsorption and desorption efficiencies can be increased by providing means for injection of gas into the adsorbent in the adsorption columns, the adsorbent utilization efficiency can be enhanced so that effect of reducing the dimensions of the adsorption columns and lowering the construction cost of the facilities can be achieved.

What is claimed is:

1. A method of separating gas mixture comprising: an adsorption process in which a gas mixture is fed from one of two ends of an absorption column packed with an absorbent so as to allow adsorbable components in the gas mixture to be adsorbed and unadsorbed gas is discharged from the other end of the adsorption column; and adsorber regeneration process wherein after completion of the adsorption process adsorbed components are desorbed by depressurizing the adsorption column by sucking gas therein in the opposite direction to the direction of gas mixture feeding; a pressurizing process wherein after completion of the adsorbent regeneration process, the adsorption column is pressurized up to adsorption pressure either by refeeding the gas mixture into the adsorption column from the same direction as said gas mixture is fed or by feeding unadsorbed gas into said adsorption column, said adsorption process being repeated again after completion of the said pressurizing process, wherein said gas mixture is fed into the adsorption column at a position intermediate the two ends of the adsorption column, through a shell side of the adsorption column, at a latter half-stage of said adsorption process.

2. A method of separating gas mixture according to claim 1 wherein a concentration of the same sorts of components in gas flow as are adsorbed by the adsorbent is detected near the position intermediate the two ends of the adsorption column, at which said gas mixture is fed into the adsorption column, and when the concentration reaches a reference value specified in advance, supply of said gas mixture into the adsorption column through the shell side of the adsorption column is commenced.

3. A method of separating gas mixture comprising: an adsorption process in which a gas mixture is fed from one of two ends of an absorption column packed with an absorbent so as to allow adsorbable components in the gas mixture to be adsorbed and unadsorbed gas is discharged from the other end of the adsorption column; an adsorbent regeneration process wherein after completion of the adsorption process the adsorption column is depressurized by sucking gas therein in the opposite direction to the feeding direction of said gas mixture and further the adsorbed components are purged by feeding the unadsorbed gas from said opposite direction; and a pressurizing process wherein after completion of the adsorbent regeneration process said adsorption column is pressurized to the adsorption pressure either by refeeding said gas mixture into the adsorption column from the same direction as said gas mixture is fed or by feeding unadsorbed gas into the adsorption column, said adsorption process being repeated again after completion of the pressurizing process, wherein said gas mixture is fed into the adsorption column at a position intermediate the two ends of the adsorption column, through a shell side of the adsorption column, at a latter half-stage of said adsorption process, and said unadsorbed gas is fed into the adsorption column at a position intermediate the two ends of the absorption column, through a shell side of the adsorption column, at the latter half-stage of unadsorbed gas feeding in the adsorbent regeneration process.

4. A method of separating gas mixture according to claim 3 wherein a concentration of the same sorts of components in gas flow as are adsorbed by the adsorbent is detected near the position intermediate the two ends of the adsorption column, at which said gas mixture is fed to the adsorption column, and when the concentration reaches a reference value specified in advance, supply of said gas mixture into the adsorption column through the shell side of the adsorption column is commenced.

5. A method of separating gas mixture according to claim 3 wherein a concentration of the same sorts of components in gas flow as are adsorbed by the adsorbent in the adsorption column is detected near the position intermediate the two ends of the adsorption column where the unadsorbed gas is fed into the adsorption column, and when the concentration reaches a reference value specified in advance, supply of said unadsorbed gas into the adsorption column through the shell side of the adsorption column is commenced.

6. A method of separating gas mixture according to claim 3 wherein said unadsorbed gas is injected into the adsorption column, while the adsorption column is depressurized by sucking gas therein during the adsorbent regeneration process.

7. A gas mixture separating apparatus comprising: an adsorption column having a first end for feeding a first gas mixture thereto and a second end for discharging a second gas mixture therefrom, said adsorption column being packed with an adsorbent; a gas mixture column-end feeding device for feeding the first gas mixture to said first end; and unadsorbed-gas column-end discharging device for discharging unadsorbed gas from the second end of the adsorption column; a pressurizing device for pressurizing column; and an adsorption column depressurizing device, connected to the first end of the adsorption column, for depressurizing the adsorption column, wherein it further comprises a gas mixture side-injection device for feeding said first gas mixture to the absorbent in the adsorption column from an intermediate position between the first and second ends of the adsorption column, through a shell side of the absorption column.

8. A gas mixture separating apparatus according to claim 7 wherein said gas mixture side-injection device is branched from said gas mixture feeding device.

9. A gas mixture separating apparatus according to claim 7 wherein it further comprises concentration sensors adapted to detect the concentration of the same sorts of components in gas flow as are adsorbed by the adsorbent in the adsorption column in the vicinity of the position at which said gas mixture side-injection device is installed.

10. A gas mixture separating apparatus according to claim 7 wherein it further comprises a plurality of said gas mixture side-injection devices and a switching-over device thereof.

11. A gas mixture separating apparatus comprising: an adsorption column having a first end for feeding a first gas mixture thereto and a second end for discharging a second gas mixture therefrom, said adsorption column being packed with an adsorbent; a gas mixture column-end feeding device for feeding the first gas mixture to said first end of the adsorption column; an unadsorbed-gas column-end discharging device for discharging unadsorbed gas from the second end of the adsorption column; an unadsorbed-gas column-end feeding device for absorbent regeneration purposes, which is connected to the second end of the adsorption column, where unadsorbed gas is discharged; a pressurizing device for pressurizing said first gas mixture to be fed to the absorption column; and an adsorption column depressurizing device, connected to the first end of the adsorption column, for depressurizing the adsorption column, wherein it further comprises a gas mixture side-injection device for feeding said first gas mixture to the adsorption column at a first intermediate position between the first and second ends of the adsorption column, through a shell side of the absorption column; and an unadsorbed-gas side-injection device for feeding said unadsorbed gas to the adsorption column at a second intermediate position between the first and second ends of the adsorption column, through a shell side of the adsorption column.

12. A gas mixture separating apparatus according to claim 11 wherein it comprises concentration sensors adapted to detect the concentration of the same sorts of components in gas flow as are adsorbed by the adsorbent in the adsorption column in the vicinity of the location at which said gas mixture side-injection device is installed.

13. A gas mixture separating apparatus according to claim 11 wherein it comprises concentration detecting sensors adapted to detect the concentration of the same sorts of components in gas flow as are unadsorbed by the adsorbent in the adsorption column in the vicinity of the location at which said unadsorbed gas side-injection device is installed.

14. A gas mixture separating apparatus according to claim 11 wherein said unadsorbed-gas side-injection device is branched from said unadsorbed-gas column-end feeding device.

15. A gas mixture separating apparatus according to claim 11 wherein it comprises a plurality of said gas mixture side-injection devices and a switching-over device thereof.

16. A gas mixture separating apparatus according to claim 11 wherein it comprises a plurality of said unadsorbed-gas side-injection device and a switching-over device thereof.

17. A gas mixture separating apparatus comprising: an adsorption column having a first end for feeding a first gas mixture thereto and a second end for discharging a second gas mixture therefrom, the adsorption column being packed with an adsorbent, a gas mixture column-end feeding device for feeding the first gas mixture to said first end of the adsorption column; an unadsorbed-gas column-end discharging device for discharging unadsorbed gas from the second end of the adsorption column; an unadsorbed-gas column-end feeding device for absorbent regeneration purposes, which is connected to the second end of the adsorption column; a pressurizing device for pressurizing said first gas mixture to be fed to the absorption column; and an adsorption column depressurizing device connected to the first end of the adsorption column, for depressurizing the adsorption column, wherein it further comprises a gas mixture side-injection device for feeding said second gas mixture to the adsorption column, at an intermediate position between the first and second ends of the adsorption column, through a shell side of the absorption column.

18. A gas mixture separating apparatus according to claim 17 wherein it comprises a plurality of unadsorbed-gas side-injection devices and a switching-over device thereof.

19. A gas mixture separating apparatus comprising: an adsorption column having a first end for feeding a first gas mixture thereto and a second end for discharging a second gas mixture therefrom, the adsorption column being packed with an adsorbent; a gas mixture column-end feeding device for feeding the first gas mixture to the first end of the adsorption column; an unadsorbed-gas column-end discharging device for discharging an unadsorbed gas from the second end of the adsorption column; a first unadsorbed-gas column-end feeding device connected to the second end of the adsorption column; a pressurizing device for pressurizing said first gas mixture to be fed to the first end of the absorption column; and a second unadsorbed gas column-end feeding device for feeding the unadsorbed gas to the first end of the adsorption column, wherein it further comprises at least one of (1) a gas mixture side-injection device for feeding said first gas mixture to the adsorption column, at an intermediate position between the first end and the second end of the adsorption column, through a shell side of the absorption column; and (2) an unadsorbed-gas side-injection device for feeding said unadsorbed gas to the adsorption column, at an intermediate position between the first end and the second end of the adsorption column, through a shell side of the adsorption column.

20. A gas mixture separating apparatus according to claim 19 wherein it further comprises an adsorption column depressurizing device, connected to the first end of the adsorption column, for depressurizing the adsorption column.

21. A gas mixture separating apparatus comprising: an adsorption column having a first end for feeding a first gas mixture thereto and a second end for discharging a second gas mixture therefrom, the adsorption column being packed with an adsorbent; a gas mixture column-end feeding device for feeding the first gas mixture to the first end of the adsorption column; an unadsorbed gas column-end discharging device for discharging unadsorbed gas from the second end of the adsorption column; a pressurizing device for pressurizing said first gas mixture to be fed to the first end of the absorption column; and an adsorption column depressurizing device connected to the first end of the adsorption column, for depressurizing the adsorption column; wherein it further comprises, a plurality of gas mixture side-injection devices for feeding said first gas mixture to the adsorption column, at an intermediate position between the first end and the second end of the adsorption column, through a shell side of the absorption column; and a switching over device for switching the plurality of said gas mixture side-injection device for feeding said first gas mixture to the adsorption column, at an intermediate position between the first and the second end of the adsorption column, through a shell side of the adsorption column; a switching-over device for switching the plurality of said gas mixture side-injection devices from one another; concentration sensors for detecting a concentration of the same sorts of components in gas flow as are adsorbed by the adsorbent in the adsporption column in the vicinity of the position at which the plurality of gas mixture side-injection devices are installed; and a control device for switching over said switching-over device depending upon the value of the concentration detected by the concentration sensors.

22. A gas mixture separating apparatus comprising: an adsorption column having a first end for feeding a first gas mixture thereto and a second end for discharging a second gas mixture therefrom, the adsorption column being packed with an adsorbent; a gas mixture column-end feeding device for feeding the first gas mixture to the first end of the adsorption column; an unadsorbed-gas column-end discharging device for discharging unadsorbed-gas from the second end of the adsorption column; an unadsorbed-gas column-end-feeding device for absorbent regeneration purposes, which is connected to the second end of the adsorption column; a pressurizing device for pressurizing said first gas mixture to be fed to the first end of the absorption column; and an adsorption column depressurizing device connected to the first end of the adsorption column for depressurizing the adsorption column, wherein it further comprises, a gas mixture side-injection device for feeding said first gas mixture to the adsorption column, at a position intermediate the first and second ends of the adsorption column, through a shell side of the absorption column; and a plurality of unadsorbed-gas side-injection devices for feeding said unadsorbed gas to the absorption column, at a position intermediate the first and second ends of the adsorption column, through a shell side of the adsorption column, a switching-over device for the plurality of unadsorbed-gas side-injection devices, concentration detecting sensors for detecting a concentration of the same sorts of components in gas flow as are adsorbed by the adsorbent in the adsporption column in the vicinity of the position at which unadsorbed-gas side-injection devices are installed; and a control device for operating said switching-over device, depending upon the value of the concentration detected by the concentration sensors.

* * * * *